Sept. 21, 1926.  
P. PEIL, JR  
MANURE CONVEYER  
Filed March 6, 1925
1,600,357
4 Sheets-Sheet 4
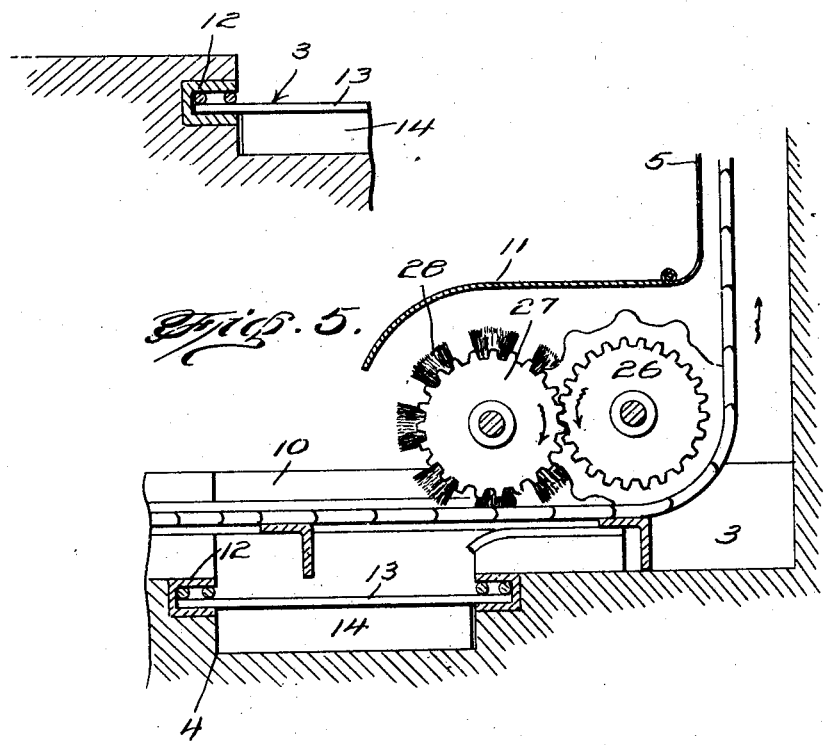
Inventor  
Peter Peil, Jr.
By  
Attorney Patented Sept. 21, 1926.

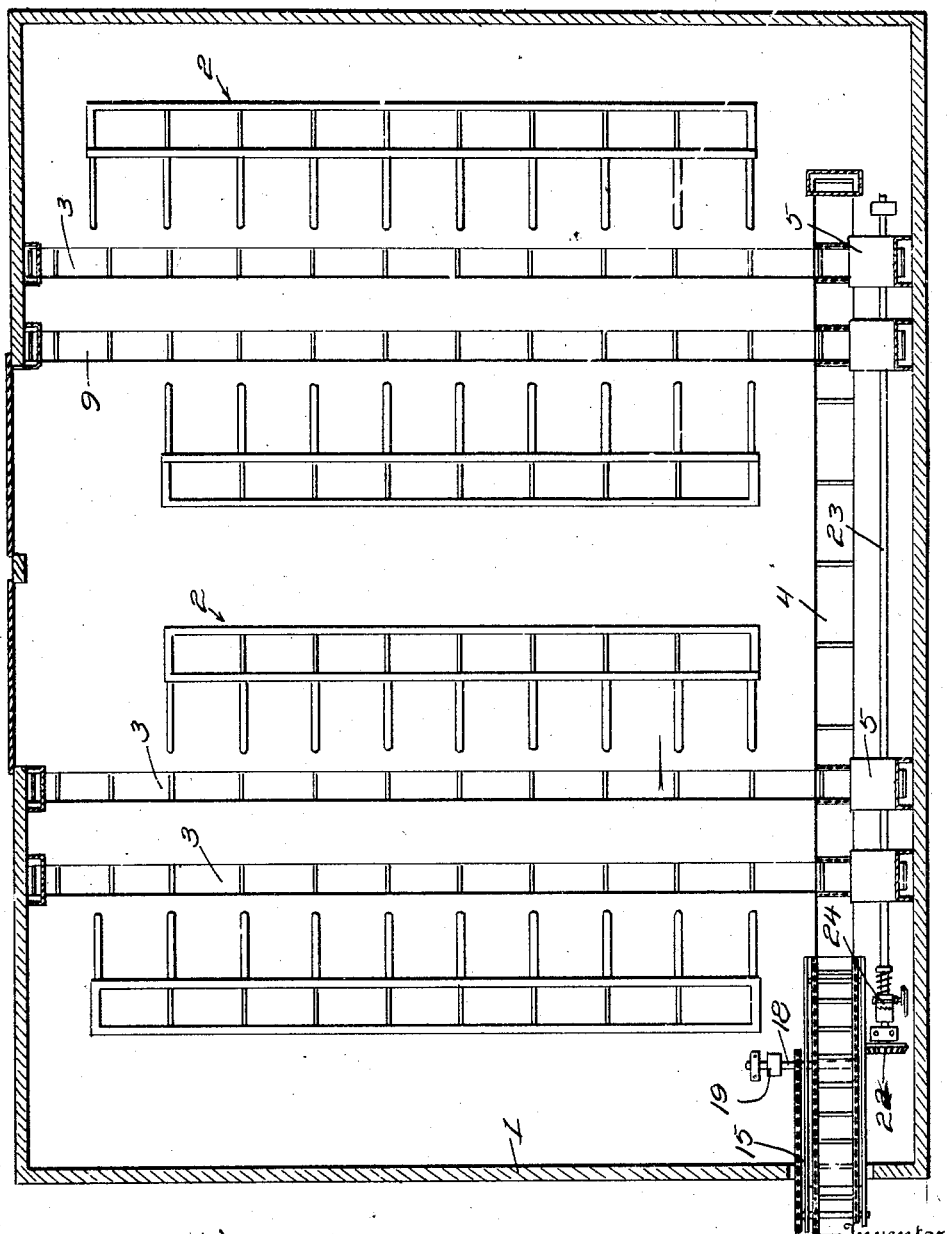

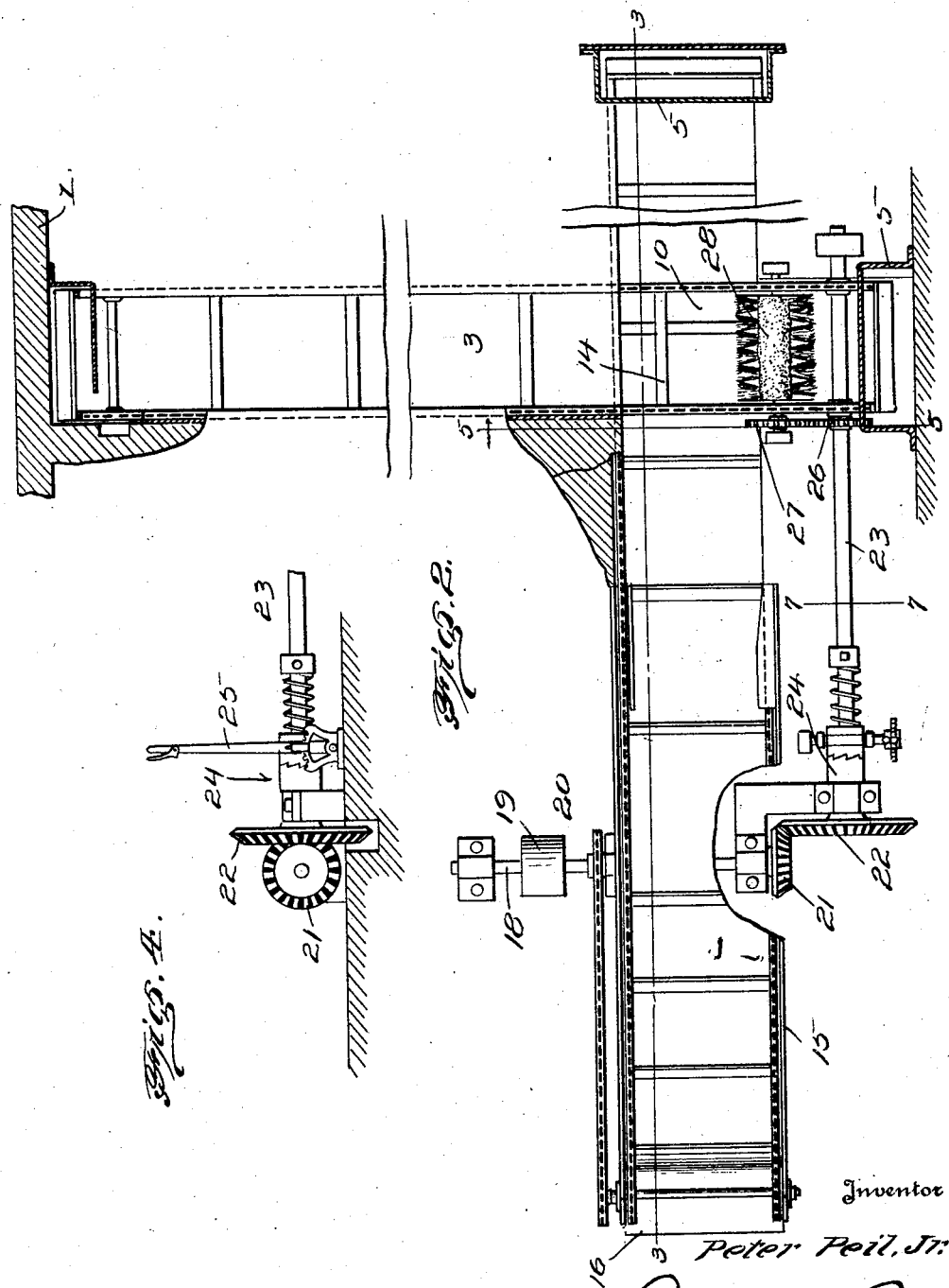

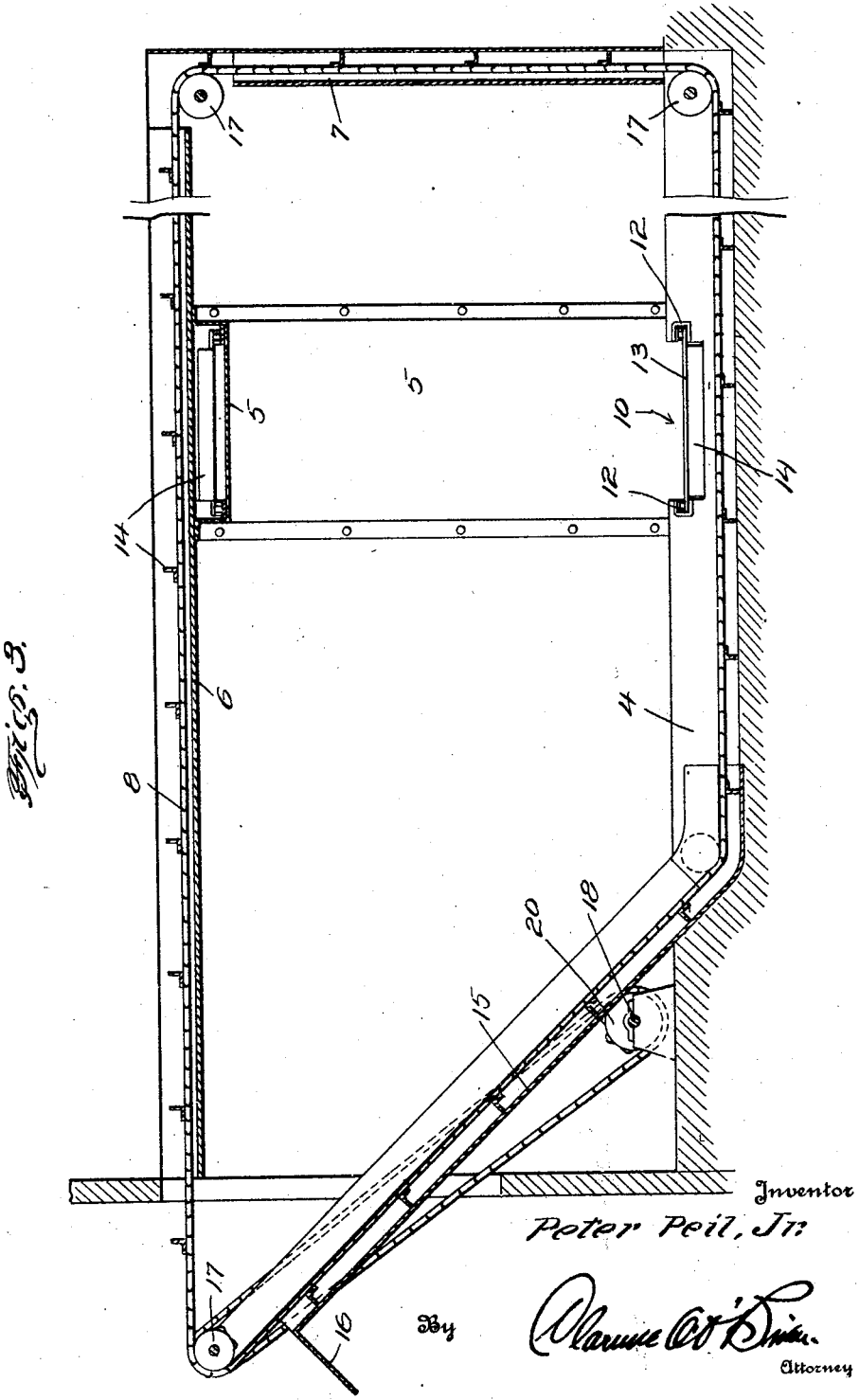

1,600,357

UNITED STATES PATENT OFFICE.

PETER PEIL, JR., OF BLOOMER, WISCONSIN.

MANURE CONVEYER.

Application filed March 6, 1925. Serial No. 13,519.

This invention relates to an improved manure conveyer of the type adapted for use in stables for automatically carrying manure from animal stalls to the exterior of the stable to be deposited in a wagon or the like.

It is my primary object to provide a device of this class which is highly adaptable for use in a comparatively large stable where there are a number of rows of stalls, it being my idea to provide a conveyer for each row and to provide a separate conveyer for co-action with all of the row conveyers for collecting the manure carried by the latter and conducting it to the exterior of the stable as before stated.

More particularly, each row of stalls will, in accordance, with my idea, be provided with a dirt collecting gutter, and there will be a conveyer located in each gutter.

In addition there will be a main gutter extending at right angles and crosswise of the first named gutter on a lower elevation in which a single conveyer will be located to operate in carrying out the material collected from all of the auxiliary or first named gutters.

Additional features and advantages of the improved structure will become apparent from the following description and drawings.

In the accompanying drawings forming a part of this application and in which like numerals are employed to designate like parts throughout the same:

Figure 1 is a view of the interior of a stable showing what may be thought to be a diagrammatic embodiment of the present invention.

Fig. 2 is an enlarged detail view showing the structure in section and elevation to illustrate more clearly the cooperation of parts.

Fig. 3 is a longitudinal vertical section taken approximately upon the plane of the line 3—3 of Fig. 2.

Fig. 4 is a detail view of a portion of the operating or driving means.

Fig. 5 is an enlarged detail section taken approximately upon the plane of the line 5—5 of Fig. 2, Fig. 6 is a detail sectional and elevational view showing certain parts isolated from other complemental parts.

Fig. 7 is a section taken approximately upon the plane of the line 7—7 of Fig. 2, looking in a direction from right to left.

Referring to the drawings in detail, and directing attention more particularly to Fig. 1, it will be seen that the reference character 1 designates generally a suitably constructed stable of the type utilized for housing cows, horses, and other domestic animals. Arranged within the stable at longitudinally spaced points are a plurality of stall units or structures 2.

In the present embodiment I have shown four of such units and these are arranged at predetermined longitudinally spaced points, the stalls themselves being of any appropriate construction and being arranged in alinement to provide ways may be said to be rows of stalls. The various rows of stalls are arranged sufficient distances apart to permit the formation of two separate gutters 3 between each pair of stall units. For a purpose to be later seen, these gutters shall be known as the auxiliary gutters.

It will be noted that these auxiliary gutters are located close to the entrances of the stalls so that they will be properly positioned to collect the material in a well known manner. Disposed in the space existing between the ends of the stalls and one side wall of the stable, is an additional gutter 4 which extends at right angles to the gutters 3 on a plane below the same. This gutter is to be known as the main gutter.

By directing attention to Figs. 3 and 5 for instance, the approximate relative elevations of the auxiliary and main gutters will be clear. Also as seen from these figures, channel shaped boxings 5 are arranged at the ends of the gutters 3, extending vertically upon the side walls of the stable and across the ceiling as shown particularly in Fig. 3. Furthermore, as clearly represented here, a guide channel 6 is fastened to the top wall and a second guide channel 7 is fastened to the end wall to accommodate and house an endless conveyer 8. This conveyer and its guide channel are disposed at right angles with respect to the boxings and conveyers 9 operating in these gutters 3. Attention is now directed to the point of intersection of the gutters 3 and 4 as shown more plainly in Fig. 5.

This point of intersection forms what may be referred to as a pit 10. It will be observed that an appropriately designed shield 11 is associated with the pit as is shown. The purpose of this part is to be brought out more clearly as the description proceeds.

The conveyers in each instance comprise endless chains, the links of which operate in guide channels 12 embedded in the vertical side walls of the concrete gutters as shown in Figs. 5 and 6. Connected to these chains are cross pieces 13 carrying scraper blades 14 movably contacting the bottoms of the respective gutter.

Noting Figs. 2 and 3, particularly, it will be seen that the main gutter 4 communicates with an inclined discharge trough 15 extending upwardly and outwardly through an opening in one end wall of the stable. This trough terminates in a downwardly inclined deflector 16 adapted to empty the material into a wagon or the like on the exterior of the stable.

Appropriately mounted sprockets 17 are of course provided to permit the chains of the conveyers to be trained thereover as shown in Fig. 3.

Appropriate operating means plainly represented in Fig. 2 is employed for driving the conveyers from a single source of power. The means comprises a pulley shaft 18 journaled in appropriate bearings and provided with a belt pulley or the like 19. Mounted on the intermediate portion of this shaft is a sprocket wheel 20 and on the opposite end thereof is a beveled gear 21. The gear 21 is in mesh with a larger beveled gear 22 on the driven shaft 23. A suitable clutch 24 operates in association with the shaft 23 for controlling the rotation thereof.

A pivotally mounted lever 25 may be provided for operating the clutch. Shaft 23 is provided with a sprocket for operating the conveyer chains of the conveyers 9. Also on this shaft is a spur gear 26 meshing with a similar gear 27 serving to operate a cleaning brush 28. This brush as better shown in Fig. 5 is rotatable in a direction from right to left for instance and serves to effectively clean the material from the cooperating conveyer so that it will be discharged into the pit.

From the foregoing description it is obvious that when the clutch is thrown in, the conveyers in the main and auxiliary gutters will be simultaneously moved slowly through the gutters, the blades thereof serving to scrape any material which may have collected therein. The material deposited in the auxiliary gutters by the animals while standing in their stalls is carried from these gutters and emptied into the so-called pits from which it is carried by the conveyer in the main gutter upwardly through the trough and to the exterior of the stable to be discharged into a waiting wagon or the like.

It is thought that the foregoing description taken in connection with the accompanying drawings, will enable persons skilled in the art to which the invention relates to obtain a clear understanding of the same. Therefore, a more lengthy description of the invention is thought unnecessary.

Although the preferred embodiment of the invention has been shown and described, it is to be understood that minor changes coming within the field of invention claimed may be resorted to if desired.

Having thus described my invention, what I claim as new is:—

In a system for handling manure, in combination, a stable, a plurality of rows of stalls in said stable, a manure collecting gutter for each row of stalls, a main collecting gutter formed in the floor of the stable at corresponding ends of the first named gutters, said main gutter being disposed on a plane below the bottoms of the first named gutters, an upwardly inclined chute communicating with the discharge end of the main gutter, the discharge of said chute extending to the exterior of the stable, a plurality of endless conveyers, there being a conveyer for each gutter, and protecting shields for the vertical and upper horizontal stretches of the conveyers, said shields being in the form of boxings, and means for simultaneously operating the conveyers whereby the manure from the first named or auxiliary gutters is scraped into the main gutter for ejection.

In testimony whereof I affix my signature.

PETER PEIL, Jr.